Oct. 23, 1923.
H. L. OPSAHL
INDICATOR AND SIGNAL
Filed Oct. 18, 1920
1,471,625
2 Sheets-Sheet 1
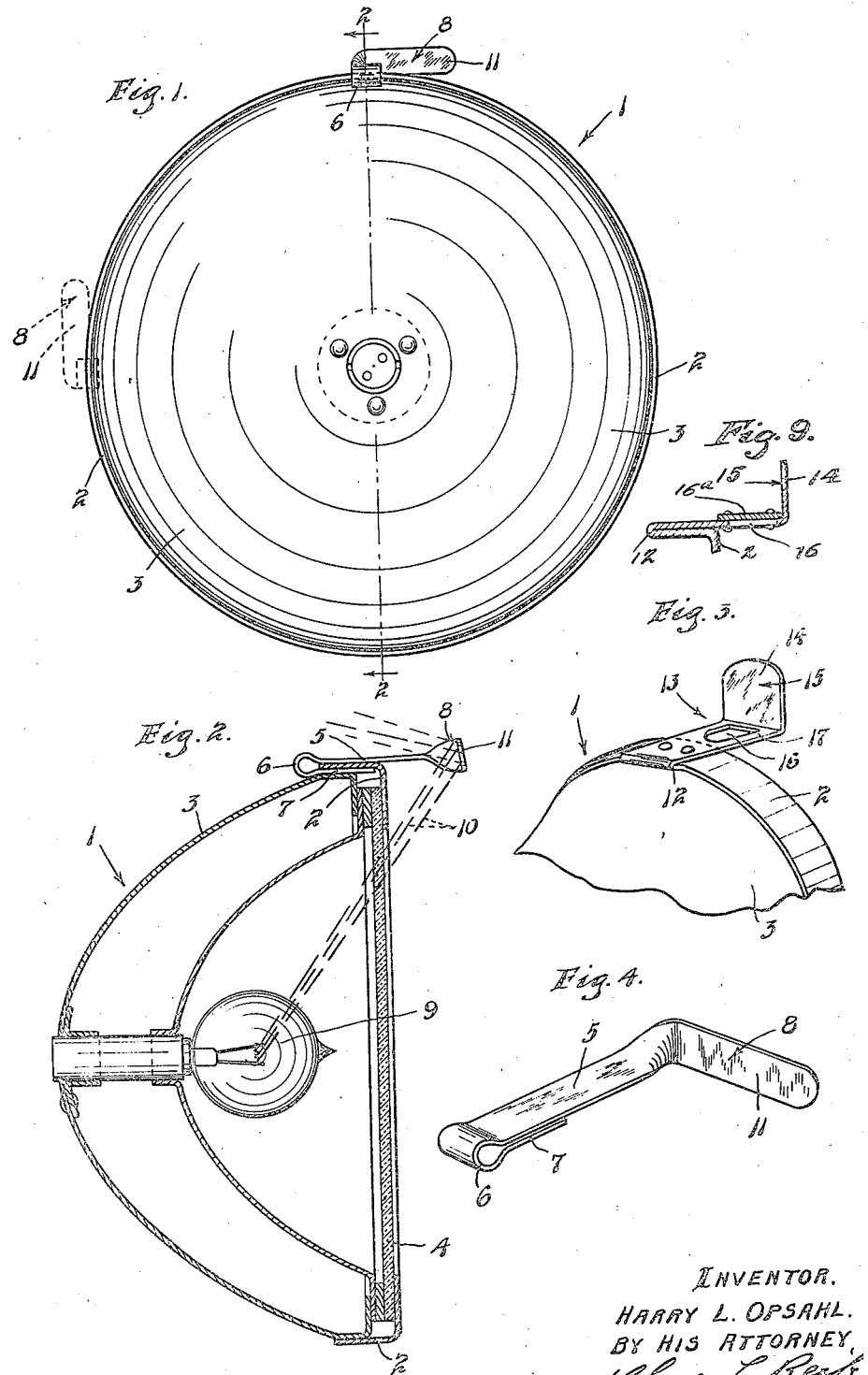
INVENTOR.
HARRY L. OPSAHL.
BY HIS ATTORNEY,

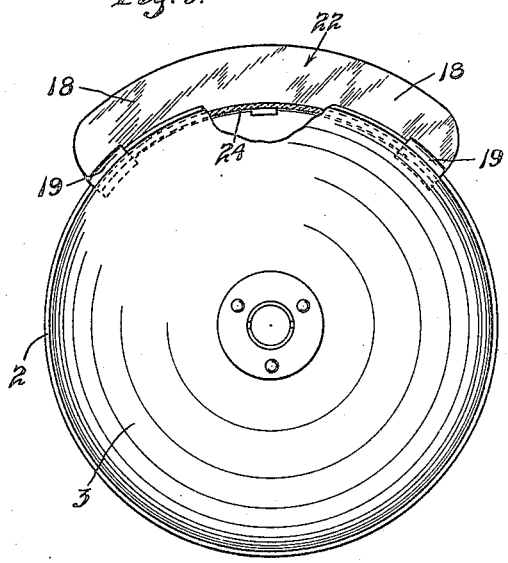
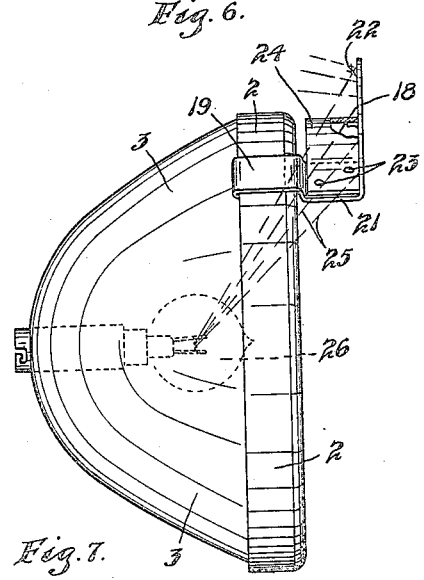
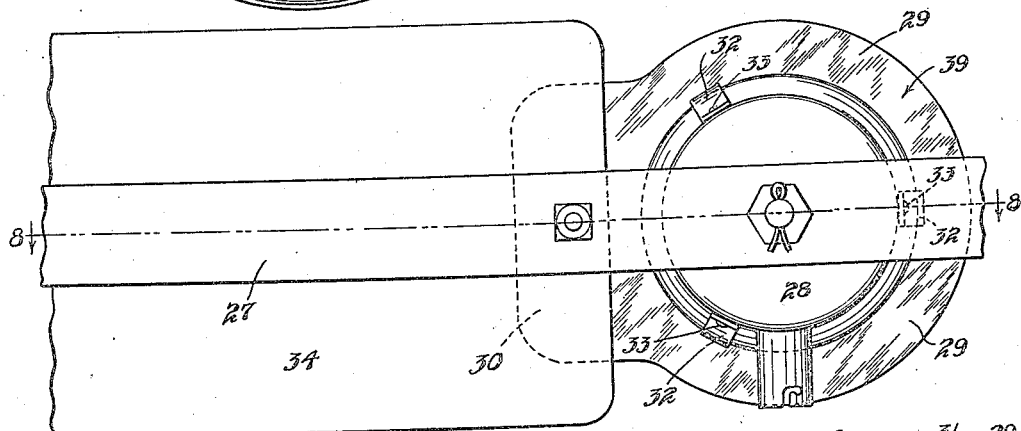
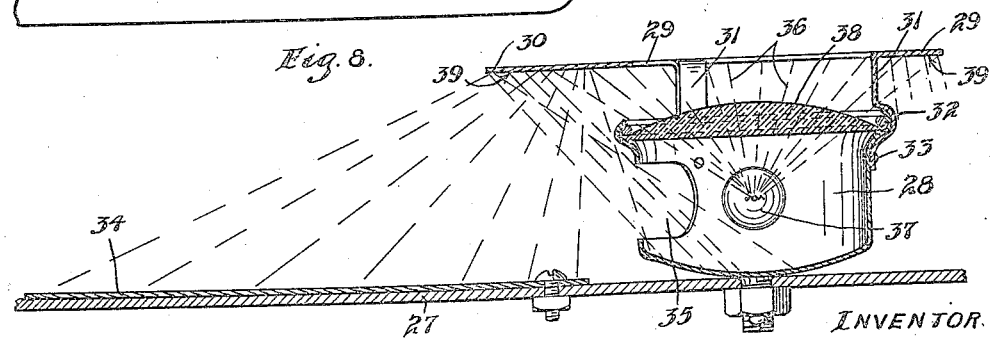

Patented Oct. 23, 1923.

1,471,625

UNITED STATES PATENT OFFICE.

HARRY L. OPSAHL, OF MINNEAPOLIS, MINNESOTA.

INDICATOR AND SIGNAL.

Application filed October 18, 1920. Serial No. 417,735.

*To all whom it may concern:*

Be it known that I, HARRY L. OPSAHL, a citizen of the United States, residing at Minneapolis, in the county of Hennepin and State of Minnesota, have invented certain new and useful Improvements in Indicators and Signals; and I do hereby declare the following to be a full, clear, and exact description of the invention, such as will enable others skilled in the art to which it appertains to make and use the same.

This invention relates to a signal device or indicator and is illustrated, particularly, as applied to a lamp used on an automobile, motor cycle, motor boat, or other vehicle.

One object of this invention is to produce a simple device for readily indicating to the driver or occupant of an automobile or other vehicle, whether or not the lamps are lighted or burning.

It is a further object of the invention to provide such an indicator which may also be used as a parking signal or reflector. Another object of the invention is to construct such an indicator which, while serving for the above purposes, may also be used to illuminate the license tag or some other desired part of the vehicle.

Further objects of the invention will appear as the description proceeds in connection with the accompanying drawings in which like reference characters designate the same parts throughout the various views, and in which, Fig. 1 is a view of an automobile or other lamp with one form of the attachment applied thereto;

Fig. 2 is a central section taken on the line 2—2 of Fig. 1;

Fig. 3 is a perspective view of a slightly modified form of the device showing a part of the lamp to which it is attached;

Fig. 4 is a perspective view of one form of the device;

Fig. 5 is a rear elevation of a lamp showing a further modified form of the device;

Fig. 6 is a side elevation of Fig. 5, as viewed from the right of said figure;

Fig. 7 is a rear view in elevation of a modified form of the device applied to the tail light of an automobile; and Fig. 8 is a section on the line 8—8 of Fig. 7.

Fig. 9 is a fragmentary central section taken through the reflecting device shown in Fig. 3, but showing a modified form.

The numeral 1 indicates, generally, an automobile or other similar lamp, as viewed from the rear. Such lamps usually have a circular rim 2 surrounding the main body portion 3 for holding in place the glass or lens 4. Applicant's device is designed to be secured between the rim 2 and the body part 3 of the lamp. The device, as shown in Figs. 1, 2 and 4, comprises a narrow strip of comparatively thin metal 5 which is bent upon itself at one end to form a spring loop 6 with an overlapped portion 7 beyond the same. The other end of the strip 5 is turned through a ninety degree turn so that the surface 8 thereof lies substantially normal to the plane of portion 5. The position of the device upon the lamp is clearly shown in Figs. 1 and 2. The overlapped portion 7 is inserted between the rim 2 and the body 3 of the lens, which rim portion 2 may, or may not, have a section thereof bent to receive it. When the device is in place, as shown in Fig. 2, the rays from the lamp bulb 9 will strike the surface 8, as shown by the lines 10. As shown, in Fig. 2, the surface 8 is not exactly normal to the plane of the portion 5 but extends at a right angle to normal. It will be understood that the surface 8 of the end portion 11 of the device will be highly polished. The rays from the lamp striking on surface will be reflected backwardly into the vehicle and the driver or other occupant of the same, can readily tell by the illumination of surface 8 whether or not the lamp is lighted or burning.

A modified form of the device is shown in Fig. 3 in which the rear end 12 thereof is shown as integral with the rim 2, but in this form of the device, the same will be formed from an extension 13 which will be stamped out of metal at the same time as the rest of the rim 2. The device will then be bent into the position shown in said figure. As shown therein, the end of the device is bent vertically at 14 and the surface 15 of its portion will be highly polished. An aperture 16 is also shown in the horizontal portion 17 which portion projects some distance in front of the rim 2. In this modification, the light from the bulb in the lamp will shine through the aperture 16 and illuminate a section of the surface 15. The rays striking this surface will be reflected into the car and will, as described, indicate whether or not the lamp is lighted.

If desired, a colored piece of transparent material 16ª may be inserted over the opening 16 as shown in Fig. 9 and this will cause the color to be shown on surface 15, which will add to the prominence of the illumination.

In Fig. 5 is shown still another modification in which the device 18 extends over a considerable area in front of the lamp. This device is shown as having clips 19 somewhat similar to those shown in the device of Fig. 4, the ends of which are arranged to be disposed beneath the rim 2 and body 3 of the lamp. One of these clips is shown at each end of the device. In this form of the device, the clips 19 extend some distance in front of the lens, as shown at 21, and support the flat portion 18 which has the polished surface 22 thereon. Supported upon the clips 19 and secured thereto by suitable rivets 23, or other fastening means, is a section of transparent material 24 which may be of any desired color, preferably red. As shown by the dotted lines 25, the light from the bulb 26 will shine through the screen 24 and cast a red or other colored light upon the surface 22. This surface 22 is made of considerable extent, so that the illumination thereof will not only serve as an indicator as to whether the lights are lighted, but may also serve as a parking light. Parking lights are signals now required in many States and such a device as shown by applicant would serve very efficiently for such a signal.

A further modified form of the device is shown in Figs 7 and 8, which is preferably arranged to be attached to the tail light of an automobile or other vehicle. In these figures, 27 indicates a portion of a lamp supporting bracket or other part of the automobile to which the tail light 28 can be attached. The device disclosed in these figures comprises an annular portion 29 having an extended portion 30 at one side thereof, of rather large area. Clips 31 are inturned from the annular portion 29 and formed at their ends into curves 32 or other suitable shape, to embrace the rim of the lamp 28 to which they may be secured by rivets 33, or other suitable fastening means. If desired, these clips may be made of spring metal and simply sprung over the front of the tail light. At 34 is shown the usual license tag which is carried by the member 27. The lamp 28 may, or may not have an opening 35 in the side thereof. As shown by the dotted lines 36, the light from the bulb 37 will shine through the lens 38 of the lamp and be reflected backward from the polished surface 39 of the portions 29–30. Some of the rays will, as shown, be reflected upon the face of the license tag and the same will be illuminated. If the hole 35 is used in the lamp 28, the license tag will be illuminated with a white light.

From the above description, it will be seen that applicant has produced a simple device of great utility and one which can be either made integral with the lamp or detachable therefrom.

It will be noted that the reflecting surface of the indicator is located in the non-concentrated light zone, as will also be the reflection from said surface. This will make the illumination of the reflecting surface very noticeable.

Furthermore, the device can be used without effecting the general lighting or diminishing the same to any appreciable degree, and the device does not require the provision of any extra lighting equipment. As stated, if a colored screen is used, any desirable color may be selected. The device, as shown in the various modifications, can extend through either a small area circumferentially of the lamp or it may extend all the way around the same.

Actual tests made with the device, both in dark localities and in the brilliantly illuminated down town portion of the city, have demonstrated that it is efficient under all conditions of lighting.

The invention generally stated, consists in the matter shown and described and as set forth in the appended claims.

What I claim is:

1. An attachment for the rim of an automobile lamp comprising a piece of flat material having means formed thereon at one end adapted to engage with said rim, a portion extending horizontally to the front of said lamp and being bent substantially at a right angle to extend radially beyond the lamp casing to present substantially a vertical reflecting surface entirely in front of the plane of the lamp lens and adjacent thereto.

2. An indicating device comprising a piece of flat material having means formed therein adapted for attachment to a vehicle lamp, a horizontal portion extending in front of said lamp, said portion having an aperture therein and a substantially vertical portion extending upwardly from said horizontal portion beyond said lamp casing and presenting a reflecting surface adjacent said lamp.

3. An indicating device comprising a piece of flat material having means formed therein adapted for attachment to a vehicle lamp, a horizontal portion extending in front of said lamp, said portion having an aperture therein, a transparent colored screen disposed in said aperture, and a substantially vertical portion extending upwardly from said horizontal portion and presenting a reflecting surface adjacent to said lamp.

4. In combination with the lens retaining ring of a headlight casing, a bracket arm attached to the casing by a part clamped under the ring, and a reflector arranged on said arm to intercept laterally passing rays so as to reflect light from the headlight toward the driver's seat, without obstructing directly forward passage of light from the headlight.

In testimony whereof I affix my signature.

HARRY L. OPSAHL.